Jan. 17, 1950 — O. E. WOLFF — 2,495,112
SELF-DEVELOPING MAGAZINE AND FILM UNIT
Filed Nov. 8, 1946 — 2 Sheets-Sheet 1

Jan. 17, 1950  O. E. WOLFF  2,495,112

SELF-DEVELOPING MAGAZINE AND FILM UNIT

Filed Nov. 8, 1946  2 Sheets-Sheet 2

INVENTOR
Otto E. Wolff
BY Donald L. Brown
Attorney

Patented Jan. 17, 1950

2,495,112

UNITED STATES PATENT OFFICE 2,495,112

SELF-DEVELOPING MAGAZINE
AND FILM UNIT

Otto E. Wolff, Cambridge, Mass., assignor to Polaroid Corporation, Cambridge, Mass., a corporation of Delaware Application November 8, 1946, Serial No. 708,731

17 Claims. (Cl. 95—19)

This invention relates to photography and more particularly to novel photographic film assemblages and novel photographic products including such assemblages.

It is a principal object of the present invention to provide a novel film assemblage which is adapted for accomplishing a photographic processing thereof by a simple mechanical treatment as the film unit is moved within or from a camera or other apparatus and in particular is adapted for obtaining a positive image of a subject image to which a photosensitive layer in the film unit is exposed.

Another object of the invention is to provide a novel film assemblage of the type wherein there is provided a photosensitive layer, another layer, and a container having therein a liquid composition, and the various elements of the combination are so related that the photosensitive layer may be exposed to actinic light, then one layer may be brought into operative relationship with respect to the other layer, and the container and the two layers may be moved past a processing station which is preferably included in a magazine containing one or more of the novel assemblages.

Another object of the invention is to provide, in a novel product of the above type comprising a film assemblage of the above type and a magazine therefor, improved means for obtaining proper registry of the two layers and the container before the assemblage is moved past the processing station.

Another object of the invention is to provide a film assemblage of the above type having improved means for moving the film assemblage past the processing station whereby a simpler film assemblage may be designed and the danger of harming the film assemblage, such as by tearing, is eliminated.

These and other objects of the invention will in part be obvious and will in part appear hereinafter.

For a fuller understanding of the nature and objects of the invention reference should be had to the following detailed description taken in connection with the accompanying drawings wherein.

In general this invention relates to novel film assemblages particularly useful with a magazine having associated therewith a means for processing the assemblage as it is withdrawn from the magazine. The preferred type of photographic film assemblage comprises a layer of photosensitive material, another layer, a pair of leaders, a leader being associated with each of said layers, and a container having therein a liquid composition associated with one of said layers. The assemblage also comprises means for assuring proper registry between said layers when one of said layers is moved with respect to the other of said layers by means of its associated leader.

These layers are preferably slidably joined together so as to form a film assemblage which, as the result of removal from said magazine, can be processed, preferably to produce a positive image of a latent negative image obtained by exposure of the photosensitive material. With such film assemblages the photosensitive layer is positioned within the magazine for exposure to a subject image. After exposure, one of the leaders is moved so that the photosensitive layer and the other layer are brought into a predetermined face-to-face relationship, an exposed frame on the photosensitive layer being in a predetermined face-to-face relationship with an image area on the other layer. This registry is preferably obtained by the means in the assemblage and assures that a positive image produced on the image area of said other layer is accurately centered on the said other layer. After the two layers have been brought into proper face-to-face relationship with the magazine, the leaders extending from each layer can be grasped and pulled together as a unit from the magazine. By pulling on the leaders connected to each of the two layers of the film assemblage each layer is positively fed through the processing means and there is no reliance on the transmittal of the pulling force from one layer to another layer for accomplishing this removal. This permits a simple construction for the leaders and eliminates, to a large extent, the danger of tearing of the leaders even though the pull thereon is made considerably stronger in those cases where a high compression is desired for bursting the container and spreading the liquid composition.

Figure 1:
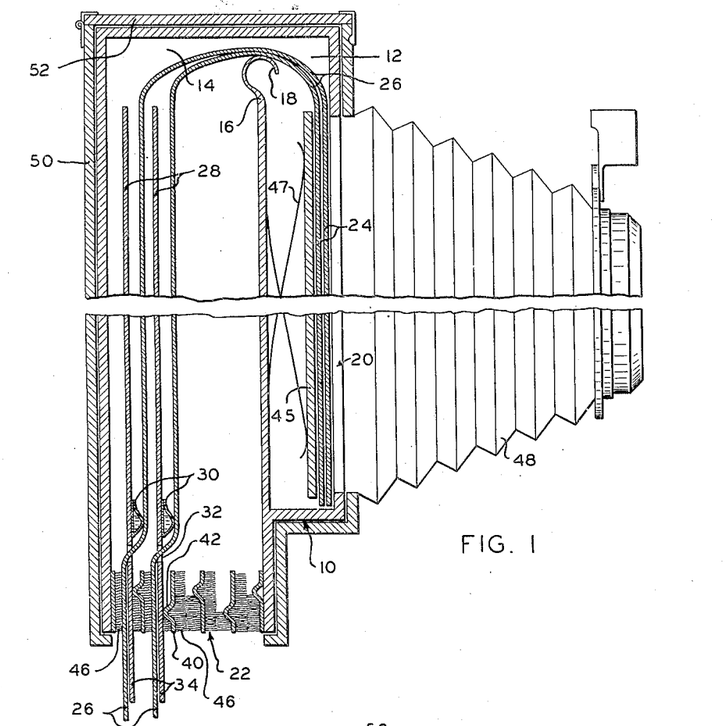
Figure 1 is an exaggerated schematic cross-sectional view of a preferred modification of the invention showing its relationship to a camera.

In a preferred form of the invention shown in Fig. 1 there is provided a magazine 10 having a front portion 12 and a rear portion 14. This magazine may contain a plurality of photosensitive layers 24, which are mounted in parallel relationship in the front portion of the magazine and so positioned that the foremost of the photosensitive layers may be exposed to actinic light through an exposure opening 20 in the front wall of the magazine. Each of these photosensitive layers has associated therewith a leader 26 which extends to the rear portion of the magazine. Each of these leaders, which may be an integral part of the photosensitive layer, are slidably connected to an associated layer 28 which preferably comprises a layer adapted to receive a positive image and hereinafter referred to as an image-carrying layer. Each image-carrying layer has associated therewith a suitable container 30 having therein a liquid composition which preferably comprises an aqueous viscous solution of a film-forming material, a developer, and a silver halide solvent.

There is also shown in Fig. 1 a schematic representation of a camera 48 having a magazine holder indicated at 58. In the top rear of the camera there is provided a cover 52 which may be removed to permit introduction of one of the novel magazines 10 into the magazine holder.

Dividing these two portions of the magazine is a wall 16 having a rounded top portion 18. At the bottom rear portion of the magazine there is provided an opening 22, in which there are positioned elements 40 defining withdrawal openings for each film assemblage. These withdrawal openings are preferably capable of applying a processing force to the film assemblage as it passes therethrough.

Figure 2:
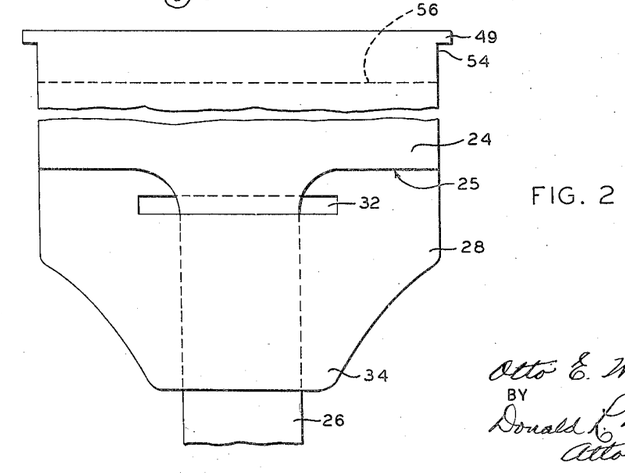
Fig. 2 is an exaggerated diagrammatic front view of the novel photosensitive layer, image-carrying layer, and leaders of Fig. 1 showing the relationship of the elements during the use of the invention.

Consideration of Fig. 2 along with Fig. 1 is helpful in an understanding of the invention. As can be seen from Fig. 1, the photosensitive layers 24 are stacked in parallel relationship in the front portion of the magazine, the foremost of these layers being in registry with the exposure opening 20 so that it may be exposed by operating the usual camera shutter. Behind the stack of the photosensitive layers there is preferably provided a backing plate 45 and a spring 47 to hold the foremost photosensitive layer flat in the focal plane of the camera. From the top edge of the photosensitive layer there extends the leader 26. This leader may be an integral portion of the photosensitive layer, as shown in Fig. 2, or it may be a strip of paper or cloth secured to either the front or back top edge of the photosensitive layer. This leader extends into the rear portion of the magazine through the whole length thereof and out through the opening 22 in the bottom of the magazine. Positioned in the rear portion of the magazine are a plurality of image-carrying layers 28, there being one image-carrying layer for each photosensitive layer 24. In the preferred form of the image-carrying layer, the bottom edge is formed into a tab or leader 34 extending to the outside of the magazine.

In any event, this leader on the image-carrying layer should be long enough so that, if it does not extend from the magazine when the image-carrying layer is in its stored position, it will extend from the magazine far enough to be grasped by the user of the camera when the image-carrying layer is in position to have the container thereon pass through the opening from the magazine. This is desirable, since during the time of maximum stress on the image-carrying layer (i. e., when the container enters the opening), the image-carrying layer may be positively drawn out of the magazine by its own leader along with the photosensitive layer. In the lower part of layer 28 there is provided a slit 32 (shown more clearly in Fig. 2) sufficiently wide to permit the leader 26 from the photosensitive layer to pass therethrough.

In the bottom rear portion of the magazine there are provided the plurality of means defining withdrawal openings. These means, in one modification, comprise a strip of metal 40 having a layer of felt 46 on each side thereof. Each metal strip is preferably provided with a raised portion 42 whose function is described in more detail later.

As can be seen from Fig. 1, the two leaders 26, 34 extend between a pair of these felt-covered metal strips. These strips, where the raised portion exists, define an opening which is preferably slightly smaller than the combined thickness of two layers and a container. These openings serve the function of permitting the withdrawal of the film assemblages from the magazine, and the felt 46 acts to prevent the access of light to the interior of the magazine. The raised portions 42 act to release the liquid composition from the containers and to spread this liquid between the photosensitive layer and the image-carrying layer. The felt 46 also aids in the uniform spreading of the liquid and trapping any excess liquid within the magazine.

In a preferred modification of the invention, the photosensitive layer 24 is formed of a photosensitive silver halide such as an emulsion of a silver halide, or a mixed silver halide, or a silver mixed halide. This emulsion is preferably coated on an opaque paper base, which is relatively cheap, and may have an integral extension constituting the leader 26. In this way it is relatively simple to manufacture a one-piece combination photosensitive layer and leader. It is possible, however, to coat the photosensitive emulsion upon a suitable base material such as cloth, paper, or cellulosic plastic, or other materials suitable for carrying photosensitive emulsions. In these latter instances the base which carries the photosensitive emulsion may or may not be integral with the leader 26. The leader 26 is preferably made narrower than the photosensitive layer so as to provide a shoulder 25 (shown in Fig. 2) at the junction between the leader and the photosensitive layer. This leader may be made of paper, cloth, or cellulosic plastic, or other materials having sufficient tensile strength to permit the use of the leader for withdrawing the photosensitive layer from the forward part of the magazine to the rear part of the magazine, and for assisting in withdrawing the composite film assemblage through the withdrawal opening. In some cases it is desirable to coat the back surface of the base for the photosensitive layer 24 with wax or other material capable of imparting to this surface an antifriction surface, thus permitting easier withdrawal of the photosensitive layer from the forward portion of the magazine.

The image-carrying layer 28 preferably comprises a sheet of opaque white paper known in the art as baryta paper, which preferably has either an opaque black paper backing or is treated on the back side thereof with a black coating to increase its opacity to actinic light. While baryta paper is a preferred material for the image-carrying layer, many other materials can be used. It can be made of gelatin, regenerated cellulose, polyhydroxy alkanes, such as polyvinyl alcohol, sodium alginate, certain of the cellulose ethers, such as methyl cellulose and their derivatives such as sodium carboxymethyl cellulose or hydroxyethyl cellulose, carbohydrates such as gums or starch, and mixtures of these materials where the latter are compatible. Where this image-carrying layer is formed of transparent plastics of the general type mentioned above, the plastics may be coated on a paper base or may be so treated that the surface to be positioned adjacent the photosensitive layer appears white by reflected light. They are also preferably provided with a backing which is opaque to actinic light. The tab or leader 34 is preferably formed integrally with the image-carrying layer 28. The slit 32 in the image-carrying layer is preferably formed so as to be just wide enough to permit the passage of the leader 26 therethrough. The liquid container 30 is preferably formed of a paper-backed metal foil, coated on the inner surface thereof with a resin such as polyvinyl butyral which is inert to alkalies.

The liquid composition in the container 30 preferably comprises a developer, such as hydroquinone, a film-forming substance, such as sodium carboxymethyl cellulose, a silver halide solvent such as sodium thiosulfate, a preservative such as sodium sulfite, an alkali such as sodium hydroxide, and a sufficient quantity of water to carry the above-mentioned elements in solution.

The magazine may be formed of metal, cardboard, or molded plastic. It is preferably of sufficient rigidity so that it may be handled as a unit, and should be opaque to actinic light. In the preferred method of assembly of the above-mentioned film assemblages and magazine, the desired number of photosensitive layers 24, with their associated leaders 26, are placed in the forward portion of the magazine, the leaders extending to the rear portion. The foremost leader is then threaded through the slit 32 in the foremost image-carrying layer and is placed adjacent one of the elements 40, the leaders 26 and 34 extending through the opening 22. Another element 40 is placed adjacent the first pair of leaders, the next leader 26 is threaded through a slit 32 in its associated image-carrying layer, and is then placed, along with leader 34, next to the last-mentioned element 40. Another element 40 is then placed next to these leaders and the film pack is thus built up until the desired number of image-carrying layers have been placed therein. The rear wall of the magazine is then placed in position and the magazine is ready for use. A spring element (not shown) may be placed between the last element 40 and the wall of the magazine.

In the use of the preferred modification of the invention, which has been described in connection with the discussion of Figs. 1 and 2 above, the foremost photosensitive layer 24 in the magazine is exposed to actinic light by suitably operating the shutter mechanism of the camera 48. The user of the camera then engages the portion of the leader 26, associated with this foremost photosensitive layer, which extends through the bottom of the magazine. By pulling this leader, the photosensitive layer 24 is pulled upwardly and over the wall 16 separating the two portions of the magazine, and moved to the rear of the rear portion and downwardly in this rear portion. As the photosensitive layer 24 moves downwardly adjacent the image-carrying layer 28 positioned in the rear of the magazine, it can be seen that the surface of the photosensitive layer which was closest to the camera lens is now adjacent the inner surface of the image-carrying layer 28. Fig. 2 shows the photosensitive layer 24 in a position where it has been moved from the front of the magazine to the rear portion and is moving downwardly in this rear portion. When the leader 26 is pulled downwardly somewhat more than is shown in Fig. 2, the shoulder 25 on the photosensitive layer engages the edges of the slit 32 and prevents further relative movement of the photosensitive layer 24 with respect to the image-carrying layer 28. At this point the exposed portion of the photosensitive layer is positioned correctly with respect to the container and the image-carrying layer. The user of the camera then grasps the two leaders 26 and 34 and moves the whole film assemblage comprising the image-carrying layer 28, the container 30, and the photosensitive layer 24 into and through the openings between the pair of members 40. As this composite film assemblage is pulled through the opening defined by these members 40, particularly in the space between the raised portion 42 and the adjacent flat portion 40, the pressure on the container 30 increases to such an extent that the liquid contained therein is forced from the container and is discharged between the photosensitive layer 24 and the image-carrying layer 28. Further movement of the unit through the opening causes the members 40 to spread this liquid composition in a uniform thin layer between the photosensitive layer and the image-carrying layer. As the unit is pulled completely through the opening, any liquid which is still being spread is wiped off the end of the composite unit and adheres to the felts 46. As a result of this spreading process, the photosensitive layer is laminated to the image-carrying layer by the viscouse liquid composition. Since these two layers are preferably opaque to actinic light, at least on the outer surfaces thereof, no light can penetrate to the inner photosensitive surface. Therefore, this composite lamination may be pulled from the camera directly into daylight and the photographic process may continue unhampered by the presence of actinic light.

When the liquid layer exists between the exposed photosensitive layer and the image-carrying layer, the developer therein develops the exposed photosensitive material, the silver halide solvent forms soluble silver complexes with the undeveloped silver halide and transfers these soluble complexes to the surface of the image-carrying layer where they are converted to insoluble colloidal particles by reaction with unused portions of the developer. After this process of positive image formation is completed, the photosensitive layer is preferably stripped from the image-carrying layer to reveal the final positive image. This processing may require anywhere from a few seconds to several minutes, depending upon the chemical constituents involved.

There is thus provided a novel magazine with novel film assemblages adaptable for use with a standard camera and which permit the production, with a few simple operations, of a positive image of a subject image toward which said camera is directed. As can be seen, this invention provides substantially dry development. No traps are needed and no special camera or developing apparatus is required. Any excess of the viscous liquid composition is wiped from the film unit by means of the felt and is trapped within the disposable magazine.

While the above description of the invention has been limited to the preferred modification thereof, the present invention is capable of considerable variations within the broad scope thereof. In connection with the construction of the magazine, a preferred form has been shown wherein the members 40 which define the withdrawal openings are positioned in the bottom of the rear portion thereof. It is contemplated that these withdrawal openings may be positioned at the top of the magazine, such construction depending upon the particular type of camera with which the magazine is to be used. In either case, the operation of the withdrawal openings is the same.

There are many other modifications possible for the means defining these withdrawal openings, and it is possible to provide a single withdrawal opening through which all of the leaders 26 are threaded. This modification is not as desirable as the one shown in Fig. 1, since a considerable unit area of pressure is required for releasing the liquid composition from the container, and this pressure in some cases may be sufficiently high so as to create a considerable friction between the film assemblage passing through the withdrawal opening and adjacent leaders extending through the opening. This friction may be sufficient to cause a movement of these other leaders. Such a modification of the invention is possible, however, particularly where means are provided for increasing the resistance to withdrawal of the photosensitive layers from the forward portion of the magazine. Such a means can be a pin extending through a weakened portion in the lower edge of the photosensitive layers. A similar pin can also be provided for holding the image-carrying layers, if desired.

The withdrawal openings may be made in a number of ways and from a wide variety of materials. They can be formed of metal strips which can be placed under tension. They can be made of a metal stamping having springy tongues adapted to engage opposite outer surfaces of the composite film unit. Numerous materials other than felt, such as velvet, mohair or bristles, can be utilized as a light seal. In some cases the felt or velvet may serve only a light seal function, while in other cases it may serve the function of breaking the container, spreading the liquid, and trapping the excess liquid. Another modification of the invention contemplates the breaking of the container and the spreading of the liquid solely by closely spaced metal members which may or may not have a certain flexibility. In other cases, means, completely separate from the withdrawal opening, may be provided for applying a compressive force to the container to release the liquid therefrom, and the withdrawal opening may be utilized only for spreading the liquid as the film element is withdrawn therethrough. It is also possible to provide a separate pull cord capable of ripping open the container.

Since the novel magazine described above is preferably sold as a unit for insertion in a camera, it is preferred to provide a cover sheet which is positioned in front of the foremost photosensitive layer 24 for the purpose of preventing access of actinic light to the photosensitive layers when this magazine is handled in daylight. Such a layer is not shown but may be easily provided by placing an opaque piece of paper in front of the foremost layer 24 within the magazine. Preferably attached to this opaque layer is a leader, similar to the leaders 26, so that this cover sheet may be withdrawn from the magazine after the magazine has been inserted in the camera.

While the composite film assemblage has been described in connection with a preferred embodiment thereof, numerous other photosensitive materials may be utilized. The photosensitive layer may comprise a photosensitive material other than a silver halide and developers other than those mentioned above may be advantageously employed. It is also possible to utilize, in the present invention, processes wherein it is not desired to obtain a positive image. In such a case the liquid composition in the container 30 may comprise materials for developing and fixing a negative with no emphasis on producing a positive image at the same time.

It is also possible to utilize image-forming reactions other than those discussed above. For instance, it is feasible to utilize a liquid composition which includes no silver halide solvent and to include on the image-carrying layer a substance capable of forming a positive image by reaction with unexhausted portions of a developer utilized for developing the latent negative image in the photosensitive layer. This substance may be an oxidizing agent which is capable of oxidizing portions of the developer which are unoxidized by reaction with the photosensitive material in the negative photosensitive layer. If the developer is a color-forming developer, a positive image in terms of oxidized developer is obtained upon the image-carrying layer. It is equally possible to use a reducible metal salt on the image-carrying layer, this salt being selectively reduced to form a positive image by unexhausted (unoxidized) portions of the developer. In any of the above methods it is desirable to provide some means for positively assuring selective exhaustion of the developer before the developer is made avaliable for the positive image-forming reaction. A satisfactory means of accomplishing this purpose is the provision of a slowly permeable layer coated on the surface of the image-carrying layer.

The invention has been described in connection with the use of a liquid composition which includes all of the elements necessary to process the film assemblage. This liquid composition may, however, include only water or an aqueous solution of a film-forming material, and the other substances, such as hydroquinone, hypo, etc., may be coated in solid form on the image-carrying layer where they can be subsequently dissolved as the liquid composition is spread in contact with the image-carrying layer. It is also possible to include some of the active ingredients in the liquid composition and to coat other of the active ingredients on the image-carrying layer, all of these modifications being within the scope of the present invention.

In some cases it is desirable to leave a portion of the film assemblage between the means defining the withdrawal opening for the processing of the film assemblage. This feature of the invention is shown at the top of Fig. 2 wherein there is shown a portion 54 which may be assumed to be the topmost portion of the image-carrying layer 28. As can be seen, this portion 54 has transversely extending shoulders 48 which impart to this member 54 a greater transverse dimension than the remainder of the element. When these shoulders are moved to the withdrawal openings, they cannot pass completely therethrough, since the exit from the withdrawal opening, in this case, is made narrower than the total transverse dimension of that portion of the element 54 encompassed by the shoulders. Therefore, this portion of the film element is held within the withdrawal opening and may be separated from the remainder of the film unit by tearing along a weakened portion, diagrammatically shown at 56. This portion 54 may be, as mentioned above, either a portion of the image-carrying layer 28 or a portion of the photosensitive layer 24, or may be a separate element attached to one or the other of these two layers. It preferably has substantially the same thickness and compressibility as the two leaders 26, 34 so that, as the individual film units are withdrawn, the unused openings neither gain nor lose their effective structural rigidity. This modification of the invention also has utility in preventing loss of the light seal value of the felt due to its taking a permanent set under prolonged compression. With this modification of the invention, the elements 40 may serve an additional function of furnishing an edge against which the portion 54 may be torn along the line 56.

In the modification of the invention shown in Figs. 1 and 2, means are provided for assuring registry of two layers of the film assemblage with respect to each other by positively limiting the movement of one leader with respect to the movement of the other leader. Although this is a preferred form of the invention, another means of assuring this registry may be provided whereby registry of the two layers is obtained by visually relating certain indicia associated with each of the two leaders. These indicia may be utilized as the sole means for causing registry or they may be used in a manner supplementary to the means shown in Figs. 1 and 2.

Figure 3:
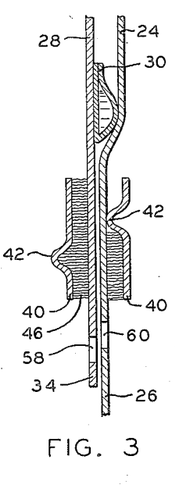
Fig. 3 is an exaggerated fragmentary diagrammatic sectional view of another modification of the invention.
Figure 4:
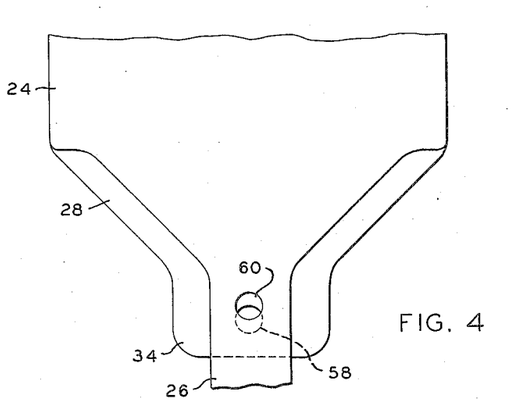
Fig. 4 is a front view of the modification of the invention shown in Fig. 3.

A preferred form of visual indicia for insuring registry of the layers is shown in Figs. 3 and 4. Fig. 3 is in section, and Fig. 4 is a right-hand view of Fig. 3. In both of these figures like numbers correspond to like elements of Figs. 1 and 2. In this modification of the invention the leader for the photosensitive layer does not extend through the image-carrying layer or through the leader associated therewith. It does, however, extend between the same means defining the withdrawal opening and is positioned adjacent the leader extending from the image-carrying layer. On the leader from the photosensitive layer there is provided a hole or other indicia which, when lined up with a hole or other indicia on the leader from the image-carrying layer, indicates alignment of the photosensitive layer with respect to the image-carrying layer and the container.

Referring specifically to Figs. 3 and 4, there is provided the usual image-carrying layer 28 having associated therewith a container 30. There is also provided a photosensitive layer 24 and a leader 26 extending therefrom. The image-carrying layer 28 also has a leader 34 provided therefor. The usual means defining the opening comprises a pair of metal members 40 having raised portions 42 and being partially covered by a resilient material such as felt, shown at 46.

As can be seen from Fig. 3, the leaders 26 and 34 extend through the opening defined by a pair of the members 40.

Near the bottom of the leader 34 for the image-carrying layer 28 there are provided visual indicia which, in a preferred form, comprise a hole 58 extending through the leader 34. In the leader 26 for the photosensitive layer 24 there are provided similar indicia, indicated as a hole therethrough at 60. As shown in Figs. 3 and 4, the leader 26 has been pulled downwardly to a position where the hole 60 is almost in alignment with the hole 58.

The various elements shown in Figs. 3 and 4 can be made of the materials specified as being preferable in the discussion of the modification of the invention of Fig. 1.

In the use of the invention shown in Figs. 3 and 4, the photosensitive layer 24 is first exposed to actinic light to create therein a developable latent negative image. The leader 26 is then pulled downwardly so as to move the photosensitive layer to the position shown in Figs. 3 and 4. A slight further movement of leader 26 brings the hole 60 into alignment with the hole 58 and the user of the camera knows that the photosensitive layer is properly registered with the image-carrying layer and the container. The user of the camera then grasps the leader 26 and the leader 34 and draws the composite film assemblage through the withdrawal opening defined by the means 40. As the composite assemblage passes the raised portion 42 in the withdrawal opening, the increased pressure on the container ruptures the container to release the liquid composition. Further movement of the assemblage through the opening spreads the liquid composition in a uniform thin layer between the photosensitive layer 24 and the image-carrying layer 28 to cause the processing of the assemblage.

While the modification of the invention described in connection with Figs. 3 and 4 is a preferred form thereof, many other visual indicia may be employed. There can be matching lines on the two leaders, or the edges thereof may be so formed as to furnish visual indicia for assuring registry of the two layers of the assemblage. As mentioned previously, these visual indicia may be included on the film assemblages of the type shown in Fig. 1 wherein means are also provided for preventing more than a certain predetermined relative movement of one layer with respect to the other layer. In some cases such a modification of the invention of Fig. 1 is desirable, particularly if the photosensitive layer has any tendency to catch on the container rather than on the edges of the slit 32 shown in Fig. 1.

In the preceding discussion of the present invention it has been limited to those modifications wherein the photosensitive layer is moved, by means of a leader, from the front portion of the magazine to the rear portion thereof where it is brought into engagement with an image-carrying layer and a container, and the composite assemblage so formed is withdrawn from the rear portion of the magazine through means defining an opening and capable of processing the film assemblage. It is equally possible to provide a magazine and film assemblages wherein the image-carrying layers are moved from the rear portion of the magazine to the front portion where they are brought into face-to-face relationship with their respective photosensitive layers. In this case, the liquid containers are preferably secured to the photosensitive layers. The composite film assemblage, with the image-carrying layer in face-to-face relationship with the photosensitive layer, is then withdrawn from the front portion of the magazine through a suitable means defining an opening therefrom.

Figure 5:
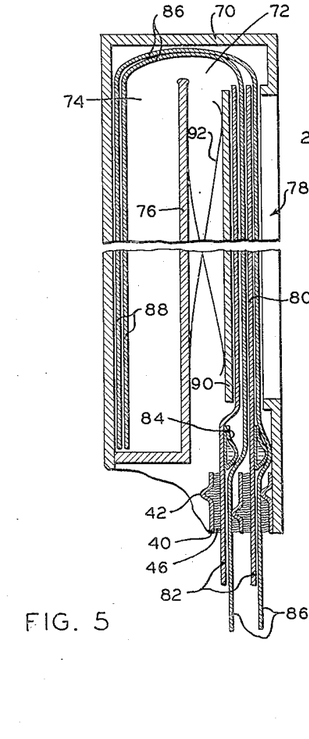
Fig. 5 is an exaggerated diagrammatic cross-sectional view of another modification of the invention.

This latter modification of the invention is shown schematically and diagrammatically in Fig. 5 which is an exaggerated cross-sectional view of a magazine embodying a number of film elements. In Fig. 5 there is schematically shown a magazine, generally represented by numeral 70. This magazine has a rear portion 74 and a front portion 72 with a wall 76 dividing these portions. Positioned in the front portion of the magazine are a plurality of photosensitive layers 80 having a bottom tab or leader portion 82. In the rear portion of the magazine there are provided a plurality of image-carrying layers 88 which have connected to the top edge thereof leaders 86. This leader 86 may be a sheet of transparent plastic, such as a sheet of cellulose acetate, extending in front of the photosensitive layer 80, or the leader may comprise a pair of leaders formed of paper, cloth, or other materials, extending along the edges of the front surface of the photosensitive layer, or the leader may comprise a sheet of opaque paper having a hole cut therein corresponding to the size of the area to be exposed on the photosensitive layer. On the lower foremost surface of each photosensitive layer there is preferably provided a container 84 having therein a liquid composition. This container may be secured to the photosensitive layer, such as by the use of suitable adhesives.

In the bottom of the front portion of the magazine there are preferably provided means defining a plurality of withdrawal openings. In Fig. 5 only two such openings are shown for simplicity of description, these openings being defined by pairs of metal members 40. It should be noted that a pair of leaders 82 and 86 extend through each opening. Suitable means for assuring registry of the layers may be provided, such as visual indicia. There are also provided a pressure plate 90 and a spring 92 for holding the foremost photosensitive layer flat in the focal plane of the camera.

In a preferred modification of the invention shown in Figs. 3 and 4, the various elements are preferably formed of materials previously indicated as being preferred. The leader 86 should be transparent if it is a solid leader extending between the photosensitive layer and the lens of the camera. In this case it may be formed of a cellulosic plastic or other plastic having suitable tensile strength for the intended use. If the leader comprises two separate strips, it may be formed of paper or other opaque material. In this case the leaders 86 should be sufficiently narrow so as not to interfere with the area of the photosensitive layer to be exposed to actinic light. In this latter case they may be formed integrally with the image-carrying layer.

In the use of the modification of the invention shown in Fig. 5, the photosensitive layer 80 is exposed to a subject image by operating the shutter of a suitable camera. The leader 86, associated with the foremost photosensitive layer, is then withdrawn by the user of the camera, thus moving the image-carrying layer 88 from the rear portion of the magazine to the front portion, and in face-to-face engagement with the photosensitive layer 80. Further movement of these leaders brings the indicia on the leader 86 into alignment with the indicia on the leader 82 and forms the photosensitive layer, the container, and image-carrying layer into a composite unit having a predetermined relationship. The two leaders 82 and 86 are then moved downwardly, moving the film assemblage through the means defining the opening for the purpose of processing the film assemblage.

The processing of this type of film assemblage is similar to that mentioned in connection with the discussion of Figs. 1 and 2. The movement of the composite film assemblage through the means defining the opening acts to release the liquid composition from the container and to spread it in a uniform thin layer between the image-carrying layer and the photosensitive layer. As previously described, this layer of liquid composition develops the latent negative image and produces a positive image on the surface of the image-carrying layer. After a predetermined time for the above processing to be completed, the photosensitive layer is stripped from the image-carrying layer so as to reveal the positive image.

While the above modifications of the invention have been described in connection with the preferred forms thereof, it is equally possible to provide a plurality of the novel film assemblages in a type of magazine which is not equipped with means at the withdrawal point thereof for processing the film assemblage. In such a case the opening or openings may be so designed as only to form a light seal therefrom, and may not have such rigidity, with respect to the releasability of the liquid from the container, as to release this liquid when the composite film assemblage is withdrawn from the magazine. In such a case, the camera is preferably provided with means for applying a mechanical stress to the assemblage. Such a means may comprise a pair of pressure rollers through which the individual leaders may be fed, or may comprise a pair of pressure plates or a pair of felt-covered metal members, similar to those shown in the previous modification of the invention. This type of construction is perfectly feasible, but is not preferred, due to the fact that it usually requires an excess of paper within the film assemblage to provide for some trapping of the excess liquid composition. Otherwise, the pressure-applying means, if permanently attached to the camera, might become filled up with the excess liquid composition, thereby interfering with the uniform spreading of the liquid composition in the subsequent film assemblages.

Figure 6:
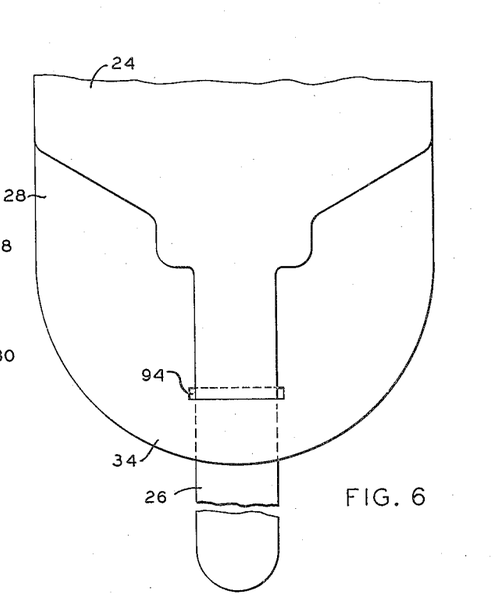
Fig. 6 is a fragmentary exaggerated front view of a slightly modified film assemblage of the type shown in Fig. 3.

In some cases it is desirable to utilize means for positively preventing more than a predetermined movement between the leader associated with one layer and the other layer. This modification of the invention is described in connection with the discussion of Fig. 1. In certain cases it may be necessary to load the magazine in complete darkness, thus making the assembly operations somewhat complex where the leader 26 from the photosensitive layer must be threaded through slit 32 in the image-carrying layer 28. Another modification of the present invention contemplates a magazine construction of the type wherein the slit for positively preventing more than a predetermined relative movement of one layer with respect to another layer is formed in the leader extending outside of the magazine. Thus the magazine may be completely assembled in darkness and thereafter the various leaders may be threaded through the associated slits in daylight. This modification of the invention is shown in Fig. 6 where like numbers correspond to like elements of Figs. 1 and 2. As shown in this figure, there is provided an image-carrying layer 28 having a leader 34 preferably formed integrally therewith. There is also provided a photosensitive layer 24 having a leader 26 associated therewith. In leader 34 there is provided a slit 94 having a transverse dimension large enough for the leader 26 to extend therethrough.

In the use of the invention shown in Fig. 6 the magazine is assembled in the same manner as described in connection with the discussion of Fig. 1 except that the leaders 26 are not threaded through the slits 94 until after assembly of the magazine has been completed. The leaders 26 are then threaded through the slits 94 in the leaders 34 and the magazine is ready for use. If desired this threading operation may be performed by the user of the camera, although it is preferable to have the magazine ready for use when sold.

It is also contemplated in connection with the modification of the invention shown in Figs. 1, 2, and 6 to provide a metal or paper becket or staple straddling leader 26 and secured to the image-carrying layer 28 or its leader 34 for the purpose of preventing more than a predetermined relative movement between the leader and the image-carrying layer. Such a staple or becket can be positioned in place of either the slit 94 or the slit 32 in the above figures. It is not shown in the drawings as it is felt that one skilled in the art will be able to appreciate this modification of the invention without requiring illustrations thereof.

Another modification of the invention, which is similar to that shown in Fig. 1, contemplates the use of containers which are staggered with relationship to each other in the rear portion of the magazine. This modification permits a thinner rear portion for the magazine, since the thickness of the various containers may be uniformly distributed throughout the whole length of the magazine rather than in one portion thereof. In this modification of the invention each leader is slidably connected to its associated container and each container is slidably mounted with respect to its associated image-carrying layer. The leader is also slidably connected to the image-carrying layer.

While the invention has been described in terms of a preferred modification thereof, i. e., where a positive image is produced on an image-carrying layer, it should be understood that the invention is not limited to this preferred form thereof. The layer which is referred to as an image-carrying layer may serve only a spreading function for the liquid released from the container, and this liquid may react only with the photosensitive layer.

The novel magazine has been shown as a complete housing, which, except for the exposure opening, is completely light-tight. This is a preferred form of magazine. However, the rear portions of the magazine may be considerably cut down so as to effect a saving of materials in manufacturing the magazine. In this case, the light-tightness may be supplied by the magazine holder on the camera. The magazine holder may also impart the necessary structural rigidity to the magazine, particularly at that portion containing the means defining the withdrawal openings. It is also preferred that the housing for the members 40, which act to process the film, be rigidly secured to that portion of the magazine housing the photosensitive layers. This, however, is not essential, particularly when the magazine holder in the camera provides a means for rigidly mounting these members 40 with respect to the portion of the magazine holding the photosensitive layers.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic film assemblage comprising a layer of silver halide photosensitive material, an image-carrying layer, a leader portion of said photosensitive layer, a leader portion of said image-carrying layer, a container having therein a liquid composition associated with one of said layers, said liquid composition including a solvent for a developer capable of developing developable portions of said photosensitive material, said film assemblage including a developer and a silver halide solvent, and means for assuring a predetermined superposed registry between said layers when said photosensitive layer is moved with respect to said image-carrying layer by means of its associated leader, said container being in position between portions of said layers adjacent an edge of an exposed area of said photosensitive layer for release of its contents between said layers when said registry is obtained, said means comprising a connection between said first-named leader and said image-carrying layer permitting only a predetermined amount of motion of said first-named leader with respect to said image-carrying layer.

2. A photographic product comprising a plurality of composite photographic film assemblages, each of said assemblages including a layer of a photosensitive material, another layer, a container having therein a liquid composition, a first leader associated with said photosensitive layer, a second leader associated with said other layer, a first aligning means associated with said first leader, a second aligning means associated with said second leader, said aligning means being equally spaced from the leading edges of corresponding areas on their associated layers, said aligning means, when aligned with each other, assuring a predetermined registry between said layers when one of said layers is moved with respect to the other of said layers by means of its associated leader, said container being associated with one of said layers so as to be moved therewith upon movement of said last-named layer by means of its associated leader, said container being in position for release of its contents between said layers when said registry is obtained, and a magazine for housing a plurality of said assemblages, said magazine comprising means defining a plurality of withdrawal openings therefrom, there being one withdrawal opening for each assemblage, portions of each of said leaders of an assemblage extending through the opening associated with said assemblage, each said opening-defining means comprising a pair of pressure-applying surfaces arranged to engage outer surfaces of their associated assemblage and apply a liquid-releasing pressure to said assemblage passing through said opening upon movement of said container and said layers through said opening.

3. A photographic product comprising a plurality of composite photographic film assemblages, each said assemblage including a layer of photosensitive silver halide material having a predetermined area thereof adapted to be exposed to actinic light, an image-carrying layer, a container having therein a liquid composition capable when spread between said layers of developing a latent negative image in said photosensitive layer and creating a positive image thereof on said image-carrying layer, a first leader associated with said photosensitive layer, a second leader associated with said image-carrying layer, a first aligning means associated with said first leader, a second aligning means associated with said second leader, said aligning means being equally spaced from the leading edges of corresponding areas on their associated layers, said aligning means, when aligned with each other, assuring a predetermined superposed registry between said layers when one of said layers is moved with respect to the other of said layers by means of its associated leader, a magazine for housing a plurality of said photosensitive layers and means defining a plurality of processing openings for releasing said liquid from said containers, there being one processing opening for each said assemblage, portions of each of said leaders of an assemblage extending through the processing opening for their assemblage, said container of an assemblage being associated with one of the layers thereof so as to be positioned between said superposed layers in advance of said area, each said opening-defining means comprising a pair of pressure-applying surfaces arranged to engage outer surfaces of their associated assemblage and apply a liquid-releasing and spreading stress to said assemblage upon movement thereof through said opening.

4. A photographic product comprising a plurality of composite photographic film assemblages, each said assemblage including a layer of photosensitive silver halide material having a predetermined area thereof adapted to be exposed to actinic light, an image-carrying layer, a container having therein a liquid composition capable when spread between said layers of developing a latent negative image in said photosensitive layer and creating a positive image thereof on said image-carrying layer, a first leader associated with said photosensitive layer, a second leader associated with said image-carrying layer, and means for assuring a predetermined superposed registry between said layers when one of said layers is moved with respect to the other of said layers by means of its associated leader, a magazine for housing a plurality of said photosensitive layers and means defining a plurality of processing openings for releasing said liquid from said containers, there being one processing opening for each said assemblage, portions of each of said leaders of an assemblage extending through the processing opening for their assemblage, said container of an assemblage being associated with one of the layers thereof so as to be positioned between said superposed layers in advance of said area, each said opening-defining means comprising a pair of pressure-applying surfaces arranged to engage outer surfaces of their associated assemblage and apply a liquid-releasing and spreading stress to said assemblage upon movement thereof through said opening, said means for assuring registry comprising means defining a slit in one of said layers through which the leader associated with the other of said layers of an assemblage extends.

5. A composite photographic product comprising a layer of photosensitive material having a predetermined area thereof adapted for exposure, another layer adapted to have a predetermined area thereof superposed on said photosensitive area, magazine means so holding said layers as to maintain said areas displaced from one another with said photosensitive area in position for exposure, a leader associated with said photosensitive layer, a leader associated with said other layer, a container having therein a liquid composition capable of processing said photosensitive layer when spread between said photosensitive layer and said other layer, said container being operatively associated with one of said layers, a first aligning means associated with said first layer, and a second aligning means associated with said second layer, said aligning means being equally spaced from the leading edges of said areas of said layers, said magazine means so holding said layers that said layers can be slidably moved by means of said leaders, the alignment of said aligning means assuring the superpositioning of said areas and positioning said container for releasing its liquid composition between said layers.

6. A composite photographic product comprising a photosensitive silver halide layer having a predetermined area thereof adapted for exposure, another layer adapted to have a predetermined area thereof superposed on said photosensitive area, magazine means so holding said layers as to maintain said areas displaced from one another with said photosensitive area in position for exposure, a leader associated with said photosensitive layer, a leader associated with said other layer, a container having therein a liquid composition capable of processing said photosensitive layer when spread between said photosensitive layer and said other layer, said container being operatively associated with one of said layers, a first aligning means associated with said first layer and a second aligning means associated with said second layer, said aligning means comprising visible indicia on said two leaders, said indicia being equally spaced from the leading edges of said areas of said layers, said magazine means so holding said layers that said layers can be slidably moved by means of said leaders, the alignment of said aligning means superposing said areas and positioning said container for releasing its liquid composition between said layers, said product carrying reagents for developing the latent image in said photosensitive layer and for forming a transfer print on said other layer, said reagents being rendered effective for this purpose when the liquid of said container is released between said layers.

7. A composite photographic film assemblage comprising a layer of silver halide photosensitive material, an image-carrying layer, a leader portion of said photosensitive layer, a leader portion of said image-carrying layer, a container having therein a liquid composition associated with one of said layers, said liquid composition includng a solvent for a developer capable of developing developable portions of said photosensitive material, said film assemblage including a developer and a silver halide solvent, and means for assuring a predetermined registry between said layers when said photosensitive layer is moved with respect to said image-carrying layer by means of its associated leader, said container being in position between portions of said layers adjacent an edge of an exposed area of said photosensitive layer for release of its contents between said layers when said registry is obtained, said means comprising a connection between said layers and including means defining a slit associated with one of said layers through which the leader associated with the other of said layers extends.

8. A composite photographic film assemblage comprising a layer of silver halide photosensitive material, an image-carrying layer, a leader portion of said photosensitive layer, a leader portion of said image-carrying layer, a container having therein a liquid composition associated with one of said layers, said liquid composition including a solvent for a developer capable of developing developable portions of said photosensitive material, said film assemblage including a developer and a silver halide solvent, and means for assuring a predetermined registry between said layers when said photosensitive layer is moved with respect to said image-carrying layer by means of its associated leader, said container being in position between portions of said layers adjacent an edge of an exposed area of said photosensitive layer for release of its contents between said layers when said registry is obtained, said means comprising a connection between said layers and including means defining a slit associated with one of said layers through which the leader associated with the other of said layers extends, said container being secured to a portion of said image-carrying layer and said means defining a slit associated with said image-carrying layer.

9. A composite photographic film assemblage comprising a layer of silver halide photosensitive material, an image-carrying layer, a leader portion of said photosensitive layer, a leader portion of said image-carrying layer, a container having therein a liquid composition associated with one of said layers, said liquid composition including a solvent for a developer capable of developing developable portions of said photosensitive material, said film assemblage including a developer and a silver halide solvent, and means for assuring a predetermined registry between said layers when said image-carrying layer is moved with respect to said photosensitive layer by means of its associated leader, said container being in position between portions of said layers adjacent an edge of an exposed area of said photosensitive layer for release of its contents between said layers when said registry is obtained, said means comprising a connection between said layers and including means defining a slit associated with one of said layers through which the leader associated with the other of said layers extends, said container being secured to a portion of said photosensitive layer and said means defining a slit being associated with said photosensitive layer.

10. A composite photographic product comprising a layer of photosensitive material having a predetermined area thereof adapted for exposure, another layer adapted to be superposed on said photosensitive area, magazine means so holding said layers as to locate said photosensitive area in position for exposure and maintain said other layer spaced from said photosensitive area, a leader associated with said photosensitive layer, a leader associated with said other layer, a container having therein a liquid composition capable of processing said photosensitive layer when spread between said photosensitive layer and said other layer, said container being operatively associated with one of said other layers, a first aligning means associated with said first layer, a second aligning means associated with said second layer, said aligning means being so spaced with respect to said layers that the alignment thereof superposes said layers and positions said container for releasing its liquid composition between said layers, and means comprising a pair of stationary pressure-applying surfaces between which portions of said leaders extend, said surfaces being separated by a distance less than the total thickness of said two superposed layers and said container, mutual movement of said leaders, subsequent to the alignment of said aligning means, drawing said superposed layers and said container between said surfaces to release and spread the liquid composition of said container between said layers.

11. A photographic product comprising a composite photographic film assemblage including a layer of photosensitive material, a second layer, a container having therein a liquid composition, a first leader associated with said photosensitive layer and a second leader associated with said second layer, said first leader being slidably connected to said second layer for limited slidable movement relative to said second layer, said slidable movement superposing said photosensitive layer upon said second layer and positioning said container for releasing its contents between said layers, and a magazine for housing said assemblage, said magazine comprising means defining a withdrawal opening therefrom, said means comprising a pair of pressure-applying surfaces arranged to engage outer surfaces of the superposed layers and to apply a liquid-releasing pressure to said container upon movement of said container and said superposed layers through said opening, portions of each of said leaders extending through said opening so that one of said leaders may be moved relative to the other to effect the superpositioning of said layers and so that said leaders may thereafter be mutually moved to withdraw said assemblage through said pressure-applying surfaces to release and spread the contents of the container between said layers.

12. A photographic product comprising a composite photographic film assemblage including a layer of photosensitive material, a second layer, a container having therein a liquid composition, a first leader associated with said photosensitive layer and a second leader associated with said second layer, said second leader being slidably connected to the photosensitive layer for limited slidable movement relative to said photosensitive layer, said slidable movement superposing said second layer upon said photosensitive layer and positioning said container for releasing its contents between said layers, and a magazine for housing said assemblage, said magazine comprising means defining a withdrawal opening therefrom, said means comprising a pair of pressure-applying surfaces arranged to engage outer surfaces of the superposed layers and to apply a liquid-releasing pressure to said container upon movement of said container and said superposed layers through said opening, portions of each of said leaders extending through said opening so that one of said leaders may be moved relative to the other to effect the superpositioning of said layers and so that said leaders may thereafter be mutually moved to withdraw said assemblage through said pressure-applying surfaces to release and spread the contents of the container between said layers.

13. A photographic product comprising a composite photographic film assemblage including a layer of photosensitive silver halide material having a predetermined area thereof adapted to be exposed to actinic light, an image-carrying layer, a container having therein a liquid composition capable, when spread between said layers, of developing a latent negative image in said photosensitive layer and creating a positive image thereof on an area of said image-carrying layer, a first leader associated with said photosensitive layer, a second leader associated with said image-carrying layer, a first aligning means associated with said first leader and a second aligning means associated with said second leader, said aligning means being equally spaced from the leading edges of said areas on their associated layers, said aligning means, when aligned with each other, assuring a predetermined superposed registry between said layers as one of said layers is moved with respect to the other of said layers by means of its associated leader, a magazine for housing at least said photosensitive layer, said housing being arranged to permit sliding of one of said layers into said superposed registry with the other layer, and means defining a processing opening for releasing said liquid from said container, portions of each of said leaders extending through said opening, said container being associated with one of said layers so as to be positioned between said superposed layers in advance of said area, said opening-defining means comprising a pair of pressure-applying surfaces arranged to engage outer surfaces of said superposed layers and apply a liquid-releasing and spreading pressure to said assemblage upon movement thereof through said opening.

14. A photographic product comprising a composite photographic film assemblage including a layer of photosensitive silver halide material having a predetermined area thereof adapted to be exposed to actinic light, an image-carrying layer, a container having therein a liquid composition capable, when spread between said layers, of developing a latent negative image in said photosensitive layer and creating a positive image thereof on said image-carrying layer, a first leader associated with said photosensitive layer, a second leader associated with said image-carrying layer, and means for assuring a predetermined registry between said layers when one of said layers is moved with respect to the other of said layers by means of its associated leader, a magazine for housing at least said photosensitive layer and means defining a processing opening for releasing said liquid from said container, portions of each of said leaders extending through said opening, said means for assuring registry comprising a connection between said leaders and including means defining a slit associated with one of said layers and through which one of said leaders extends, said container being so associated with said image-carrying layer as to be positioned between said superposed layers in advance of said area, said opening-defining means comprising a pair of pressure-applying surfaces arranged to engage outer surfaces of said superposed layers and apply a liquid-releasing and spreading pressure to said assemblage upon movement thereof through said opening.

15. In combination, a composite photographic film assemblage and a magazine, said film assemblage comprising a layer of photosensitive silver halide material having a predetermined area thereof adapted to be exposed to actinic light, an image-carrying layer, a container having therein a liquid composition capable, when spread between said layers, of developing a latent negative image in said photosensitive layer and creating a positive image thereof on an area of said image-carrying layer, a first leader associated with said photosensitive layer, a second leader associated with said image-carrying layer, a first aligning means associated with said first leader and a second aligning means associated with said second leader, said aligning means being equally spaced from the leading edges of said areas on their associated layers, said aligning means, when aligned with each other, assuring a predetermined registry between said layers, said magazine comprising means defining a withdrawal opening therefrom, portions of each of said leaders extending through said opening, said second aligning means comprising means defining a slit associated with said image-carrying layer and through which said first leader extends, said first aligning means comprising a shoulder associated with said first leader, said container being associated with said image-carrying layer so as to be positioned between said superposed layers in advance of said area, said opening-defining means comprising a pair of pressure-applying surfaces arranged to engage outer surfaces of said superposed layers and apply a liquid-releasing and spreading pressure to said assemblage upon movement of said assemblage through said opening.

16. A photographic product comprising a composite photographic film assemblage including a layer of photosensitive silver halide material having a predetermined area thereof adapted to be exposed to actinic light, an image-carrying layer, a container having therein a liquid composition capable, when spread between said layers, of developing a latent negative image in said photosensitive layer and creating a positive image thereof on an area of said image-carrying layer, a first leader associated with said photosensitive layer, a second leader associated with said image-carrying layer, a first aligning means associated with said first leader and a second aligning means associated with said second leader, said aligning means being equally spaced from the leading edges of said areas on their associated layers, said aligning means, when aligned with each other, assuring a predetermined registry between said layers, a magazine for housing at least said photosensitive layer, said housing being arranged to permit sliding of one of said layers into said superposed registry with the other layer, and means defining a processing opening for releasing said liquid from said container, portions of each of said leaders extending through said opening, said two aligning means comprising visible indicia on said two leaders, said container being associated with one of said layers so as to be positioned between said superposed layers in advance of said areas, said opening-defining means comprising a pair of pressure-applying surfaces arranged to engage outer surfaces of said superposed layers and apply a liquid-releasing and spreading pressure to said assemblage upon movement thereof through said opening.

17. A photographic product comprising a composite photographic film assemblage including a layer of photosensitive silver halide material having a predetermined area thereof adapted to be exposed to actinic light, an image-carrying layer, a container having therein a liquid composition capable, when spread between said layers, of developing a latent negative image in said photosensitive layer and creating a positive image thereof on an area of said image-carrying layer, a first leader associated with said photosensitive layer, a second leader associated with said image-carrying layer, a first aligning means associated with said first leader and a second aligning means associated with said second leader, said aligning means being equally spaced from the leading edges of said areas on their associated layers, said aligning means, when aligned with each other, assuring a predetermined registry between said layers, a magazine for housing at least said photosensitive layer, said housing being arranged to permit sliding of one of said layers into said superposed registry with the other layer, and means defining a processing opening for releasing said liquid from said container, portions of each of said leaders extending through said opening, said two aligning means comprising visual indicia on said two leaders, at least one of said visual indicia constituting means defining a hole through one of said leaders, said container being associated with one of said layers so as to be positioned between said superposed layers in advance of said area, said opening-defining means comprising a pair of pressure-applying surfaces arranged to engage outer surfaces of said superposed layers and apply a liquid-releasing and spreading pressure to said assemblage upon movement thereof through said opening.

OTTO E. WOLFF.

REFERENCES CITED

The following references are of record in the file of this patent:

UNITED STATES PATENTS

| Number | Name | Date |
|---|---|---|
| 916,325 | Kelley | Mar. 23, 1909 |
| 1,103,417 | Hopkins | July 14, 1914 |

FOREIGN PATENTS

| Number | Country | Date |
|---|---|---|
| 21,692 | Great Britain | of 1907 |
| 412,005 | Germany | Apr. 11, 1925 |
| 271,913 | Great Britain | June 2, 1927 |